(12) United States Patent
Wobben

(10) Patent No.: US 6,452,819 B1
(45) Date of Patent: Sep. 17, 2002

(54) INVERTER WITHOUT HARMONICS

(76) Inventor: Alovs Wobben, Argestrasse 19, 26607 Aurich (DE)

( * ) Notice: Subject to any disclaimer, the term of this patent is extended or adjusted under 35 U.S.C. 154(b) by 0 days.

(21) Appl. No.: 09/601,850

(22) PCT Filed: Oct. 27, 1999

(86) PCT No.: PCT/EP98/08118

§ 371 (c)(1),
(2), (4) Date: Aug. 9, 2000

(87) PCT Pub. No.: WO00/51225

PCT Pub. Date: Aug. 31, 2000

(30) Foreign Application Priority Data

Feb. 25, 1999 (DE) .......................... 199 08 124

(51) Int. Cl.$^7$ ............................... H02M 1/12
(52) U.S. Cl. ........................... 363/40; 363/132
(58) Field of Search ............ 363/39, 40, 131, 363/132; 323/205, 207

(56) References Cited

U.S. PATENT DOCUMENTS 4,063,143 A * 12/1977 Forstbauer ................. 363/40
5,499,178 A   3/1996 Mohan
5,513,090 A   4/1996 Bhattacharva et al.
5,568,371 A * 10/1996 Pitel et al. .................. 363/39
5,646,498 A * 7/1997 Lipo et al. ................. 318/800
5,661,390 A   8/1997 Lipo et al.
5,831,842 A  11/1998 Ogasawara et al.

FOREIGN PATENT DOCUMENTS

| DE | 295 06 951 U1 | 6/1995 |
| DE | 19637290 A1 | 3/1998 |
| EP | 0 598 465 A2 | 5/1994 |
| EP | 0 758 161 A2 | 2/1997 |
| WO | WO 94/18683 A1 | 8/1994 |

* cited by examiner

Primary Examiner—Adolf Deneke Berhane
(74) Attorney, Agent, or Firm—Gottlieb, Rackman & Reisman, P.C.

(57) ABSTRACT

An inverter for generating ac power from a dc source includes an intermediate circuit with switches used to convert dc to ac and an output side with output chokes. Normally undesireable harmonics are generated in inverters. In the subject inverter, these harmonics are eliminated by providing a feedback from the output side to the intermediate circuit. The feedback includes a feedback choke inductively coupled to the output chokes.

20 Claims, 8 Drawing Sheets

INVERTER WITHOUT HARMONICS

BACKGROUND OF THE INVENTION

A. Field of Invention

The invention concerns an inverter or an output filter for inverters. The output current of an inverter for higher levels of power generally has a whole series of current harmonics. Those harmonics are troublesome and they occur in an unacceptable fashion in particular when a relatively high level of power has to be fed into a network by way of inverters.

B. Background of the Invention

FIG. 1 shows an inverter with an output choke and a capacitor filter network, which markedly reduces the above-described technical disadvantage of inverters and considerably improves the current quality. The power switches T1 to T6 and the diodes connected in parallel therewith are so switched by means of pulse width modulation of the power switches that three sinusoidal output current phases U, V, W appear at the output of the inverter. The form of the output current is approximated to a sinusoidal oscillation by switching the individual switches T1–T6 on and off in a defined manner. In that case however the above-mentioned harmonics occur due to the inevitable deviations from the reference or target value.

These generated harmonics are in total equal to zero at any moment in the three-phase network. That is the case at any event because there are no other current paths (other electrical circuits). In that situation only symmetrical harmonics occur. The attempt is then made by filter circuits—as also shown at the output side in FIG. 1—to compensate for those harmonics. As the electrical network, due to the inductive and capacitive sections (components of the transmission line) also have in part very low impedances (resistances) for certain frequencies, undesirably high proportions of the harmonics still flow into the public supply network.

Therefore the object of the invention is to eliminate the above-mentioned disadvantages, so that only current with very low and if possible no harmonics at all is still fed into the public supply network. The invention further seeks to provide that the dc voltage intermediate circuit of the inverter is stabilised in respect of electrical potential (voltage value in relation to the housing, earth or the three-phase system).

OBJECTIVES AND ADVANTAGES OF THE INVENTION

In accordance with the invention, to attain that object, there is proposed an inverter having the features set forth in claim 1. Advantageous developments are described in the appendant claims.

With the inverter according to the invention, asymmetrical harmonics are generated at the inverter output side and fed back into the dc intermediate circuit. To produce the asymmetrical harmonics, in addition to the three-phase output choke at the inverter output, there is a further winding (fourth leg). This further winding transmits asymmetrical magnetic fluxes which arise out of the asymmetrical harmonics. The harmonics are collected by way of three resonant circuits, for example three LC-members. If there are still any symmetrical harmonics present at all, they are directly compensated with those resonant circuits. The asymmetrical harmonics ($\Sigma_1 \neq 0$) are fed back to the dc voltage intermediate circuit. The sum of the asymmetrical harmonics is taken off at the star point of the resonant circuits (of the filter capacitors of the resonant circuits) and coupled in or passed by way of a winding on the fourth leg into the negative bar of the dc voltage intermediate circuit. That gives a closed 'harmonic current circuit' which is illustrated in FIG. 2.

The total current of the asymmetrical harmonics, which is taken off at the star point of the resonant circuits, produces magnetic fluxes in the fourth limb of the output choke. Depending on the current situation, those magnetic fluxes flow back into the three main limbs of the output choke and thus support output inductance. As a result, there is an output inductance which is between about 5% and 20% higher than in a conventional three-phase choke. As only the harmonic current flows in the fourth winding, only very low levels of copper losses occur in this case—in relation to the main coils of the choke.

The invention and advantageous developments as well as the advantages thereof are described by way of example in the following specific description.

DETAILED DESCRIPTION OF THE INVENTION

Figure 1:
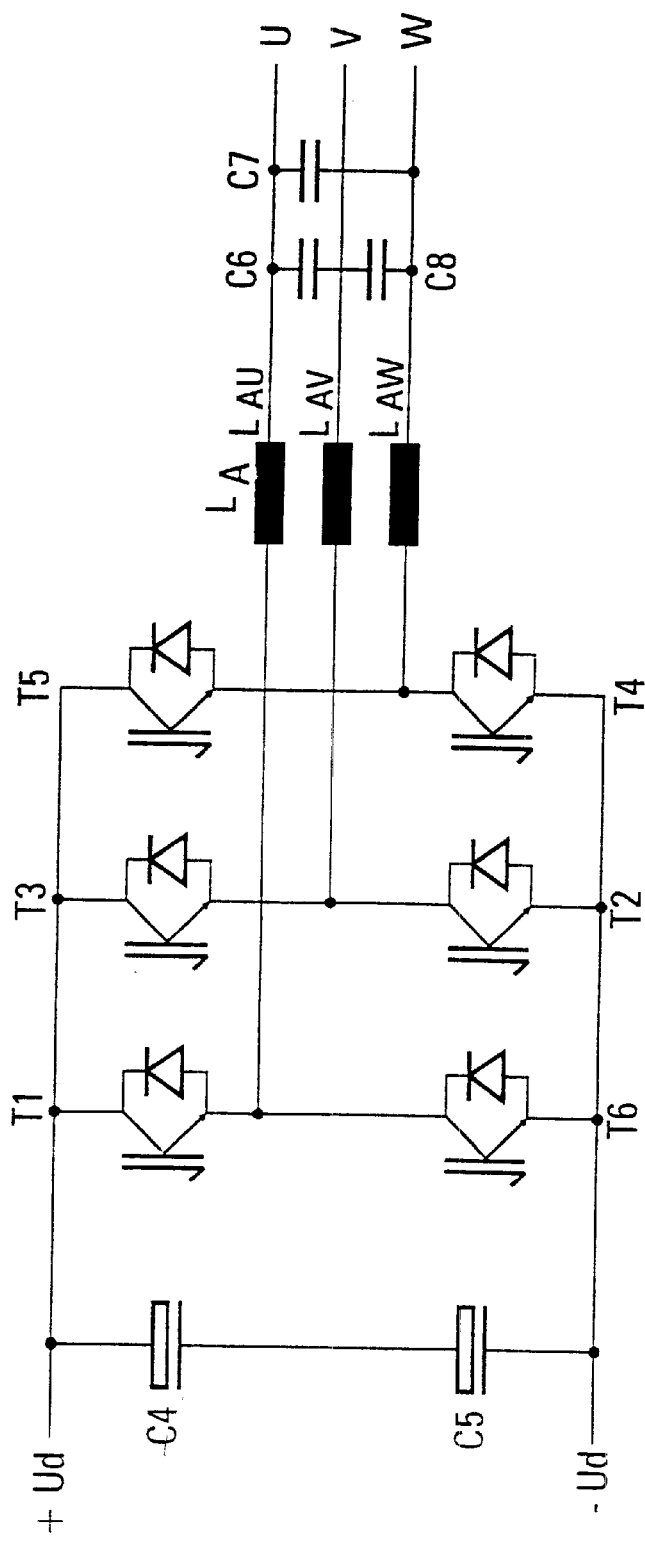
FIG. 1 shows a schematic circuit diagram of a known inverter.

FIG. 1 shows the circuit diagram of a known inverter which by virtue of the anti-parallel connection of the power switches T1 to T6 with a respective diode D1–D6 permits a four-quadrant mode of operation and can thus be put to very versatile use as a circuit. To produce the positive half-wave of the output current, the known inverter involves implementing successive switching-on and switching-off of the switches $T_n$ (n=1, 3, 5) and $T_{n+1}$ (n=2, 4, 6). For a half-wave of the output current of the U-phase of the three-phase current, this means that T1 and T6 are successively switched on and off a plurality of times during a half-wave. Connected upstream of the power switches is a dc voltage intermediate circuit with two series-connected electrolytic capacitors C4 and C5 for feeding in the dc voltage +Ud and −Ud. On the output side the inverter has an output choke $L_A$ ($L_{AU}$, $L_{AV}$, $L_{AW}$) and a downstream-connected filter comprising three capacitors C6, C7, C8 which are arranged between the respective phases. As already described above, the form of the three-phase output current U, V, W is approximated to a sinusoidal oscillation by the individual power switches T1 to T6 being switched on and off in a defined fashion. In that case however harmonics occur due to the inevitable deviations from the reference or target value. Those generated harmonics are equal to or almost zero in total at any time in the three-phase network. That is the case because there are no other current paths. The harmonics which occur however are always symmetrical and the attempt is made by means of the capacitor filter circuit to compensate for those harmonics. As however the electrical network, due to the inductive and capacitive sections (components of the transmission line) also has in part for certain frequencies very low impedance levels (resistances), high proportions of the harmonics still flow into the public supply network, which is highly undesirable.

Figure 2:
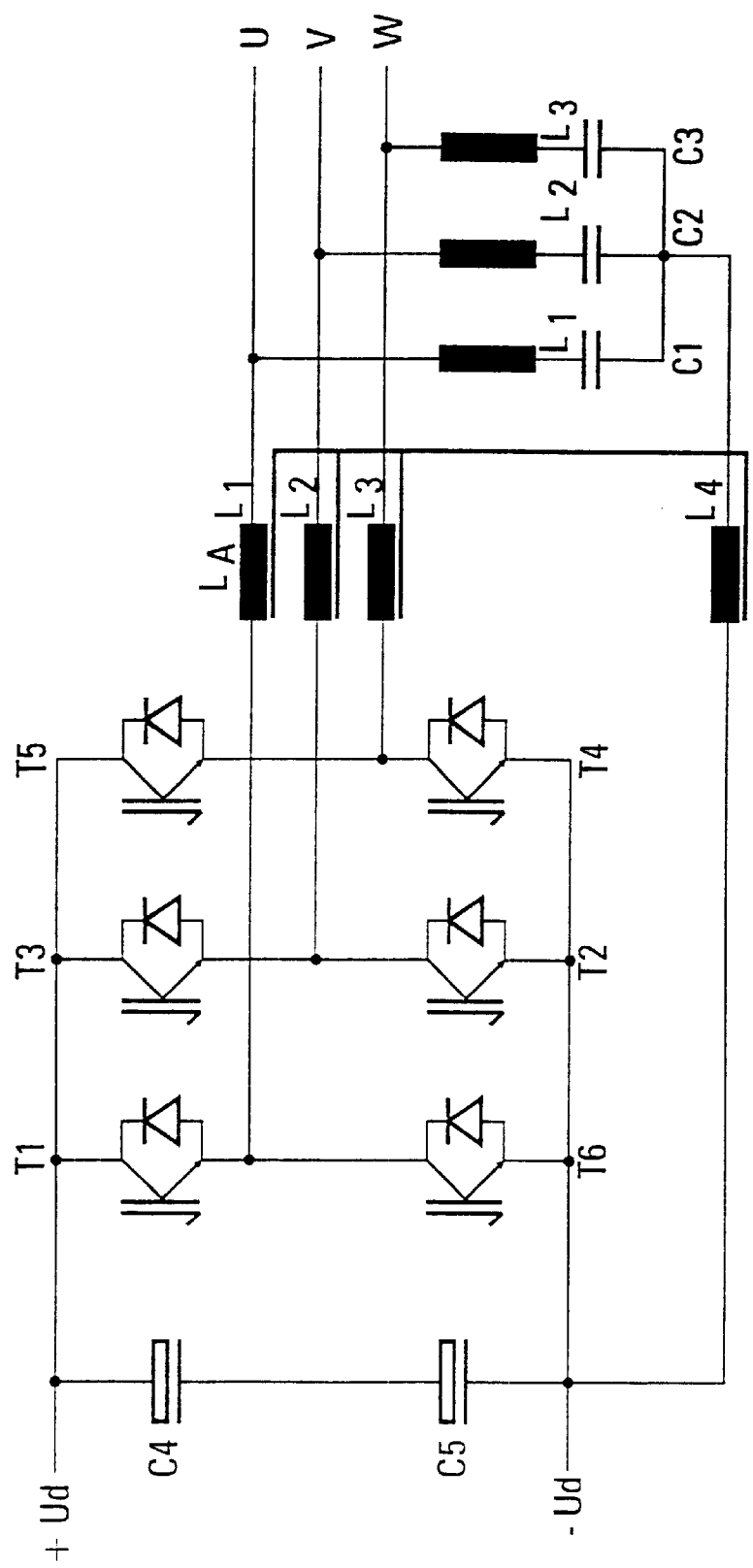
FIG. 2 shows a schematic circuit diagram of an inverter according to the invention.

FIG. 2 shows the circuit diagram of an inverter according to the invention. Like the known inverter, it has a dc voltage intermediate circuit, power switches T1–T6 and diodes D1–D6 connected in parallel therewith, and an output choke $L_A$.

The inverter according to the invention produces asymmetrical harmonics. For that purpose there is an additional winding $L_4$ (additional leg). That fourth leg $L_4$ transmits the asymmetrical magnetic fluxes which arise out of the asymmetrical harmonics. The harmonics are collected by way of three resonant circuits LC or three LC-members, comprising the inductors $L_1$ to $L_3$ and the capacitors C1 to C3, and a common star point. Symmetrical harmonics are directly compensated with those resonant circuits LC, if they are still present. Asymmetrical harmonics $L_4$ ($\Sigma_1 \neq 0$) are passed by way of the star point to the winding of the fourth leg $L_4$. That fourth winding $L_4$ is connected to the negative bar of the dc voltage intermediate circuit. The sum of the asymmetrical harmonics is thus taken off at the star point of the filter capacitors and coupled into the dc voltage intermediate circuit by way of the winding on the fourth leg $L_4$. That gives a closed harmonic circuit for the asymmetrical harmonics.

The total current of the asymmetrical harmonics, which is taken off at the star point of the capacitors, produces magnetic fluxes at the fourth leg of the output choke $L_A$. Depending on the respective situation involved, those magnetic fluxes flow back into the main legs of the output choke $L_A$, which are magnetically coupled to the fourth leg, and promote the output inductance thereof.

As a result thereof, that gives an output inductance $L_A$ which is between about 5 and 20% higher than in a conventional three-phase choke. As only the harmonic current of the asymmetrical harmonics flows in the fourth winding $L_{A4}$, in that case only very low levels of copper losses occur, in comparison with those in the main coils $L_{A1}$, $L_{A2}$, $L_{A3}$.

Figure 3:
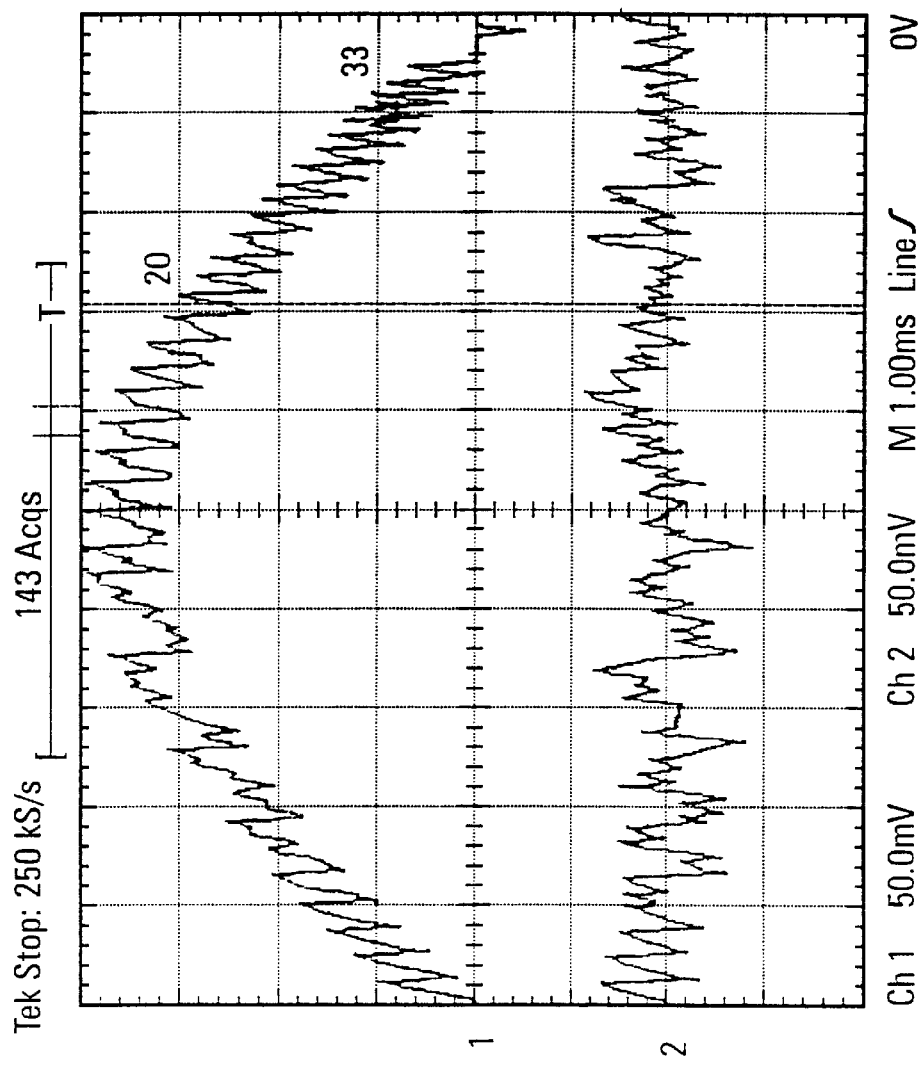
FIG. 3 shows a measuring diagram of an inverter according to the invention.

FIG. 3 shows a measuring diagram of the inverter shown in FIG. 2. The upper curve shows the positive sinusoidal half-oscillation of the current at the inverter output. In this case the hysteresis of the current is constant and the switching frequency is variable. The lower curve shows the sum of the harmonics of the three output phases of the inverter, which flow back into the dc voltage intermediate circuit by way of the fourth leg.

FIG. 4 shows once again a part of the output current of the inverter of phase 1 in a higher degree of resolution. In this case, the triangular harmonics of the output current IWR $L_A$ can be clearly seen.

Figure 4:
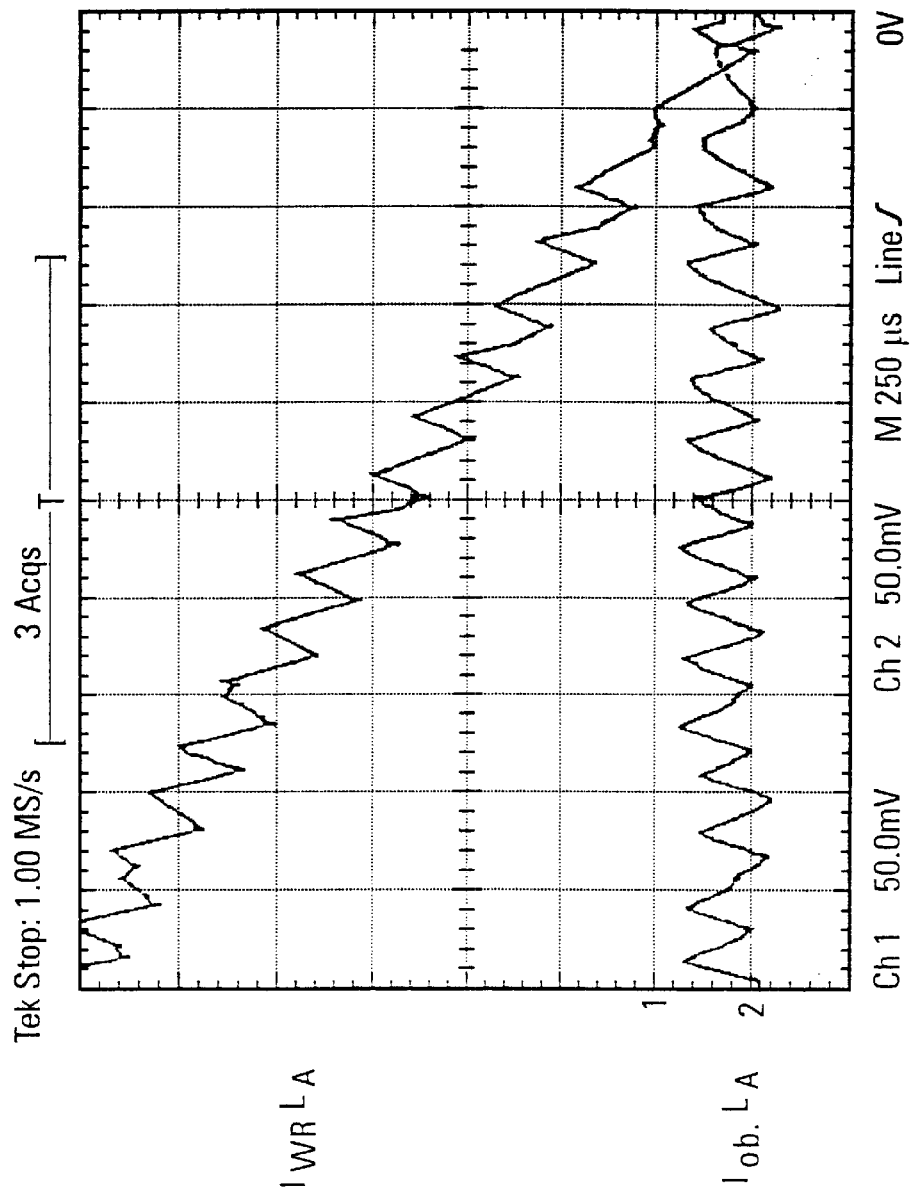
FIG. 4 shows a portion from FIG. 3 with increased resolution.

Those harmonics are separated at the output of the output inductance $L_A$ from the (sinusoidal) fundamental component with the resonant circuit comprising $L_1$ and C1. The lower curve in FIG. 4 shows the variation in respect of time of the current $IL_{1c1}$ in $L_1$ and C1.

Figure 5:
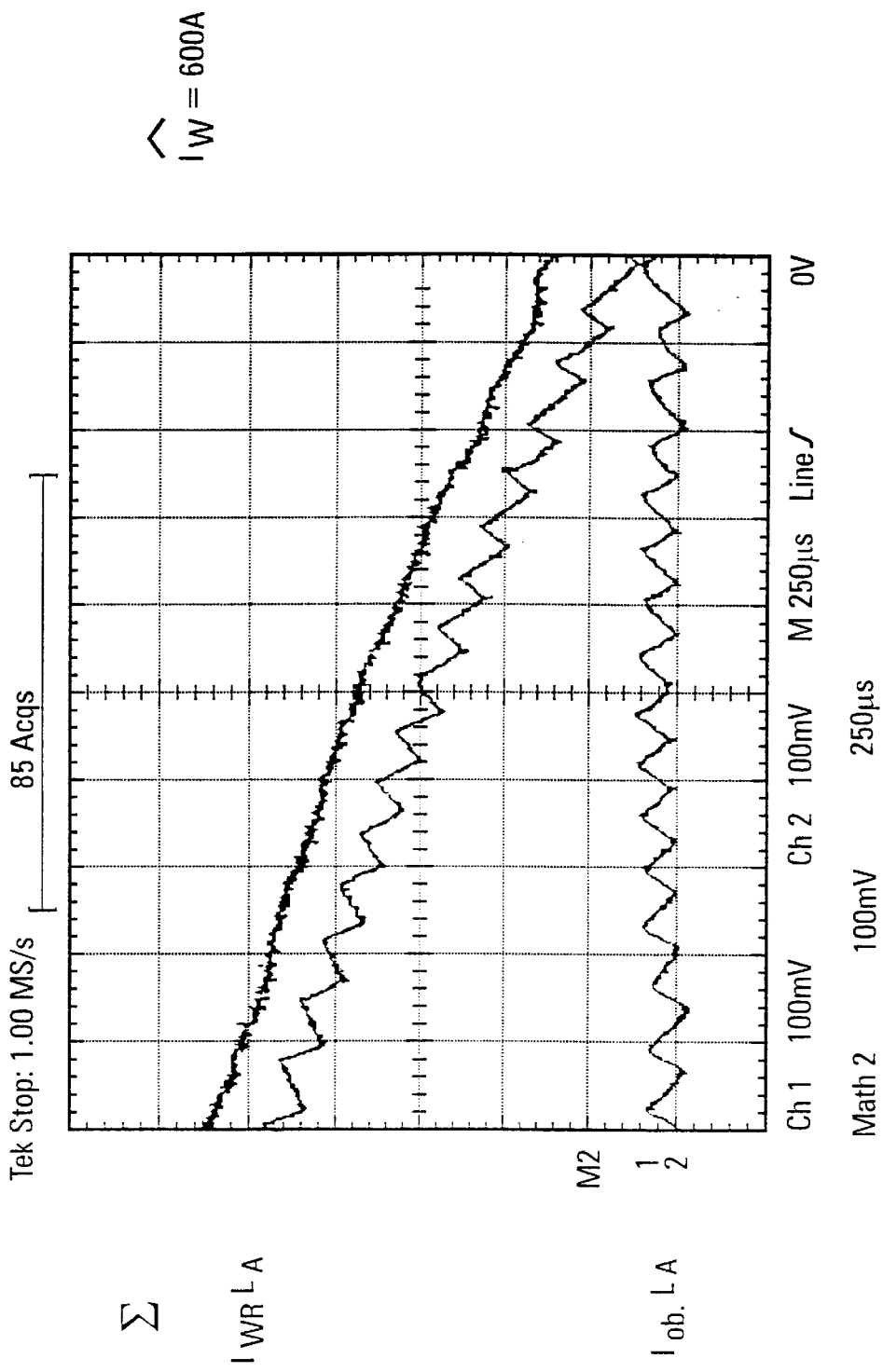
FIG. 5 shows a measuring diagram of an inverter according to the invention.

FIG. 5 shows the result of separation of the harmonics from the main current (fundamental component 50 Hz). The uppermost curve shows the output current without harmonics. This very good result is only possible with the harmonic circuit according to the invention. In this case, as can be seen from the Figures, the harmonics produced are almost 100% fed back from the inverter into the dc voltage intermediate circuit. The middle curve in FIG. 5 shows the inverter current IWR $L_A$ and the lower curve in FIG. 5 once again shows the associated harmonic current.

Figure 6:
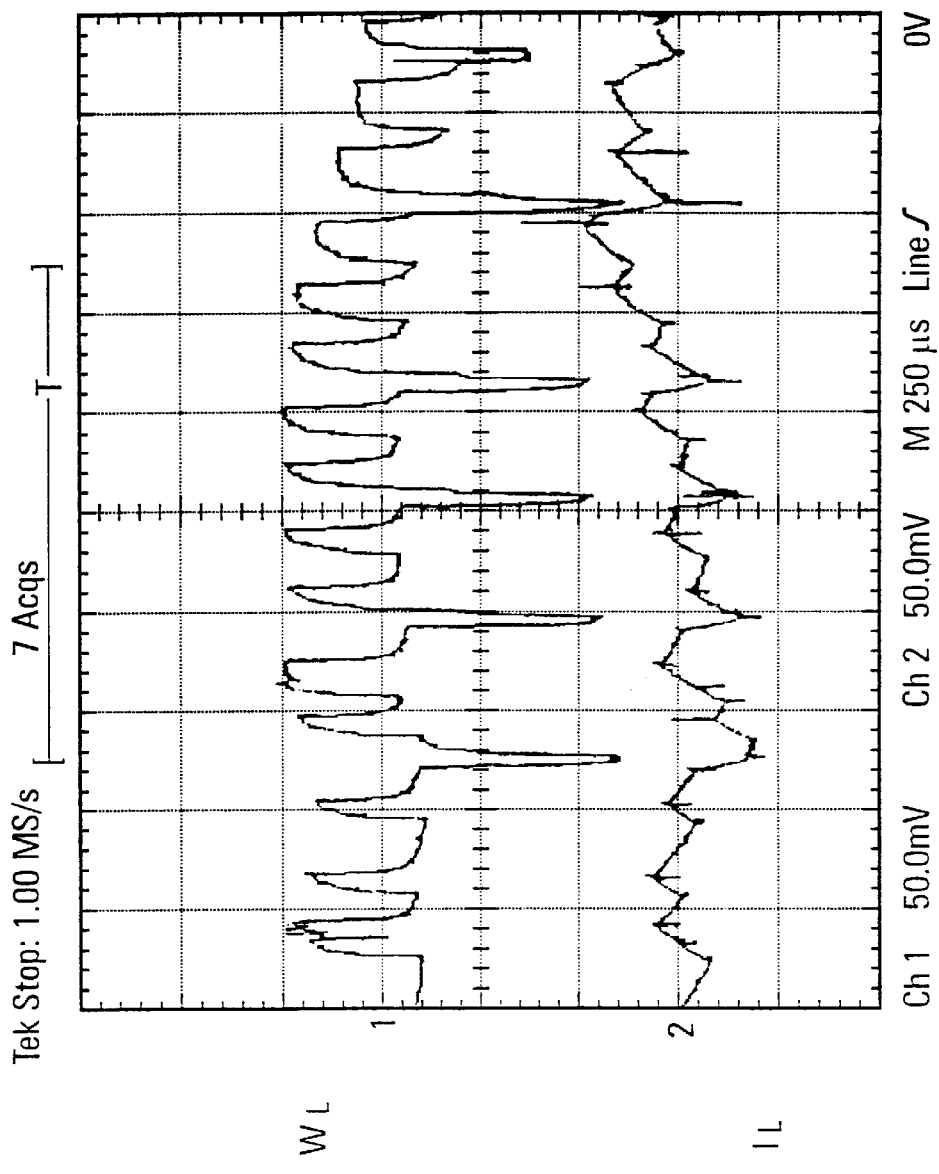
FIG. 6 shows a measuring diagram of an inverter according to the invention.

FIG. 6 (lower curve) shows the sum of the three harmonic currents $I_{21}$, $I_{22}$ and $I_{23}$. That current which contains almost all harmonics of the three phases is now used once again to enhance the action of the output choke $L_A$.

As already described, that choke comprises the three main legs $L_{A1}$, $L_{A2}$, $L_{A3}$ for the three main output windings and a fourth small subsidiary leg which is intended only for the harmonics. That fourth leg carries only the magnetic fluxes which correspond to the sum of the harmonics. The corresponding amplitude of that sum current of the harmonics is shown in FIG. 6, lower curve. The upper curve shows the corresponding voltage configuration in relation thereto. In order to achieve that, an iron cross-section of about 20% of the main legs is sufficient for the fourth leg. The fourth leg however increases the acting output inductance $L_A$ by between about 5 and 20%. That results in the output choke $L_A$ being smaller in size, and a better level of efficiency.

Figure 7:
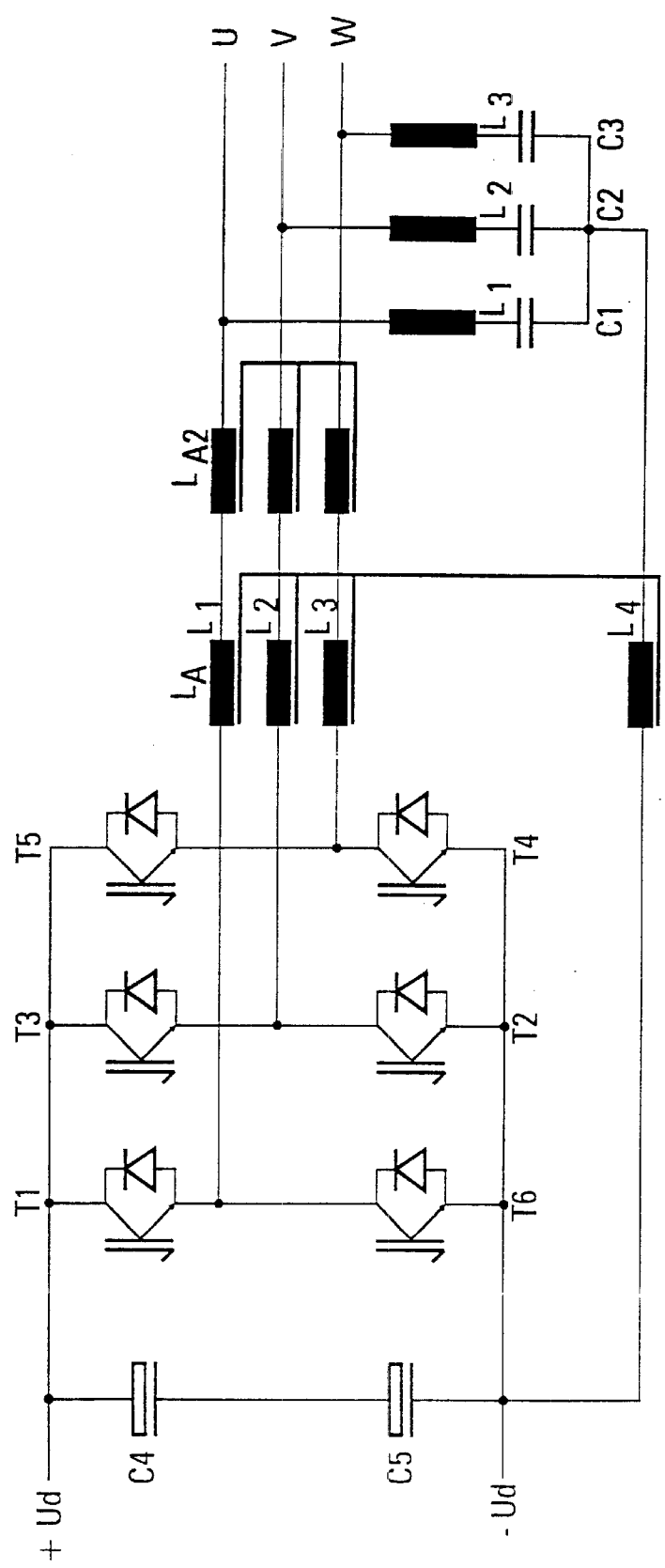
FIG. 7 shows a circuit diagram of a preferred embodiment of an inverter according to the invention.

FIG. 7 shows a development of the inverter according to the invention. In this case the output choke is of a two-part structure and comprises a four-leg choke and a compensated three-phase choke $L_{A2}$ which is connected in series therewith. Current-compensated chokes can advantageously be used for asymmetrical harmonic currents. As the sum of the network current (three-phase current) is equal to zero, the choke is not loaded with the very high fundamental components (pre-magnetised). That means that a high level of inductance can be afforded at low cost.

Figure 8:
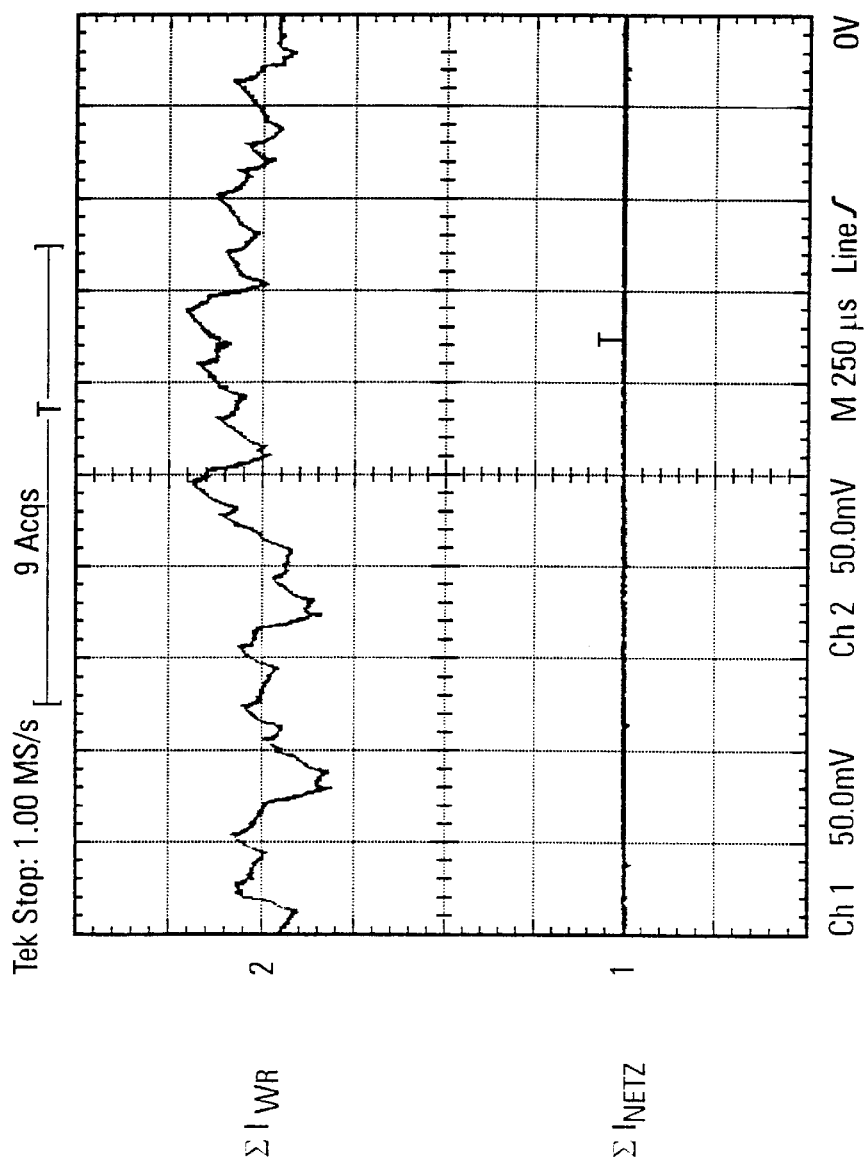
FIG. 8 shows a current measuring diagram for the inverter and network current.

FIG. 8, upper curve, shows the sum of the three output currents at the inverter output upstream of the filter. In this case the maximum amplitude is only 10% of the peak value of a phase current. The lower curve shows the sum of the output currents downstream of the filter. It will be seen that this output current is of extremely high quality and does not couple any negative harmonics into the network.

The dc voltage intermediate circuit is also simultaneously stabilised with the closed harmonic circuit. The star point of the three capacitors has a resting and in principle the same potential as earth. As that point is statically connected by way of the inductance to the intermediate circuit, a compensating current flows by way thereof if the potential of the intermediate circuit changes. Abruptly changing potentials are harmful to generators which feed into the dc voltage intermediate circuit as due to voltage changes (dU/dt) a capacitive current would flow through the insulation and in the long term gives rise to insulation damage.

Preferably an inverter according to the invention is used in a system for generating electrical energy, for example a wind power installation. Such electrical energy-generating systems then supply the network with a current of the highest quality, which also affords the consequence that the respective network operator has to implement fewer measures for safeguarding current quality.

What is claimed is:

1. An inverter for producing an alternating or three-phase current from a dc voltage comprising a dc voltage intermediate circuit having an output side an output circuit including an output choke ($L_A$) connected to said output side, and a feedback circuit including a feedback choke inductively coupled to said output choke and connected to said dc voltage intermediate circuit to feed harmonics generated in said output side to eliminate said harmonics.

2. An inverter for producing an alternating or three-phase current from a dc voltage comprising a dc voltage intermediate circuit having an output side; an output choke ($L_A$) connected to said dc voltage intermediate circuit; and a feedback loop from said output side to said dc voltage intermediate circuit, said feedback loop including a feedback choke inductively coupled to said output choke;

wherein an alternating current (three-phase current) is outputted with the inverter by way of m lines, wherein the m lines are coupled together by a resonant circuit; and wherein substantially symmetrical harmonics occurring on said output side are very substantially compensated by feeding said symmetrical harmonics back to said dc intermediate circuit through said feedback loop.

3. An inverter according to claim 1 or 2 characterised in that the resonant circuit has a tapping by way of which asymmetrical harmonics which occur at the output of the inverter are fed back into the dc voltage intermediate circuit.

4. An inverter according to claim 1 or 2 having means which produce asymmetrical harmonics at the output side.

5. An inverter according to claim 4 wherein the output choke transmits asymmetrical magnetic fluxes which arise out of the asymmetrical harmonics.

6. An inverter according to claim 4 wherein the output choke comprises m+1 legs, wherein m is a natural number, wherein a leg is associated with each three-phase current and asymmetrical fluxes which arise out of the asymmetrical harmonics are transmitted by means of the m+first leg.

7. An inverter according to claim 6 wherein the m+1 legs are magnetically coupled together and magnetic fluxes which occur in the m+first leg flow back into the m legs of the output choke.

8. An inverter according to claim 1 or 2 wherein only harmonic current flows through the m+first leg.

9. An inverter according to claim 1 or 2 characterised in that the output choke is a current-compensated choke.

10. An inverter according to claim 1 or 2 wherein the output choke comprises a four-leg choke and a series-connected three-phase choke.

11. An inverter according to claim 1 or 2 characterised in that the dc voltage intermediate circuit is stabilised with the closed harmonic circuit.

12. The inverter according to claim 1 wherein said dc voltage intermediate circuit includes two buses and wherein said output choke is connected to one of said buses.

13. The inverter according to claim 1 wherein said output choke is connected to said dc voltage intermediate circuit by another choke.

14. An inverter comprising:

a dc circuit including two buses carrying a dc voltage and switches connected to said buses to generate multiphase ac voltages;

an output circuit including a first set of output chokes, each output choke being connected to said dc circuit, a plurality of output lines connected to said output chokes and carrying said multi-phase ac voltages; and a feedback circuit including a feedback choke inductively coupled to said first set of output chokes and connected to said dc circuit to feed harmonics generated in said output circuit; said dc circuit being adapted to eliminate said harmonics.

15. The inverter of claim 14 further comprising a second set of chokes connected between said output lines and said feedback choke.

16. The inverter of claim 15 wherein said second set of chokes are connected in a star configuration.

17. The inverter of claim 15 further comprising a set of capacitors, each capacitor being connected to one of the chokes of said second set.

18. The inverter of claim 14 wherein said feedback choke is connected to one of said buses.

19. An electrical energy generating system comprising:

a dc input; and an inverter arranged to generate ac voltage from said dc input, said inverter including a dc intermediate circuit connected to said dc input, an output side with an output choke, and a feedback connected between said output choke and said dc circuit to feed to said dc intermediate circuit harmonics produced in said output side to said dc intermediate circuit, said feedback being provided to reduce said harmonics.

20. The electrical energy generating system according to claim 19 wherein feedback includes a feedback choke inductively coupled to said output choke.

* * * * *